(12) United States Patent
Barton et al.

(10) Patent No.: US 9,005,321 B2
(45) Date of Patent: Apr. 14, 2015

(54) HYDROGEN GENERATOR SYSTEM WITH LIQUID INTERFACE

(75) Inventors: Russell H. Barton, New Westminster (CA); Jason L. Stimits, Merritt Island, FL (US)

(73) Assignee: Intelligent Energy Inc., San Jose, CA (US)

( * ) Notice: Subject to any disclaimer, the term of this patent is extended or adjusted under 35 U.S.C. 154(b) by 433 days.

(21) Appl. No.: 13/423,615

(22) Filed: Mar. 19, 2012

(65) Prior Publication Data

US 2013/0244128 A1    Sep. 19, 2013

(51) Int. Cl.
*B01J 7/00* (2006.01)
*C01B 3/02* (2006.01)

(52) U.S. Cl.
CPC .......... *C01B 3/02* (2013.01); *B01J 2219/00029* (2013.01); *C01B 2203/066* (2013.01)

(58) Field of Classification Search
CPC   C01B 3/065; C01B 2203/066; Y02E 60/362; H01M 8/04216; H01M 8/04208; H01M 8/065; H01M 8/04201; H01M 8/0687
See application file for complete search history.

(56) References Cited

U.S. PATENT DOCUMENTS

| | | | |
|---|---|---|---|
| 5,723,229 A * | 3/1998 | Scheifers et al. | 429/416 |
| 6,610,433 B1 * | 8/2003 | Herdeg et al. | 429/443 |
| 6,818,334 B2 | 11/2004 | Tsang | |
| 6,899,862 B2 | 5/2005 | Baldwin et al. | |
| 2002/0182459 A1 * | 12/2002 | Hockaday et al. | 429/19 |
| 2003/0037487 A1 * | 2/2003 | Amendola et al. | 48/76 |
| 2003/0082427 A1 * | 5/2003 | Prasad et al. | 429/34 |
| 2003/0138679 A1 * | 7/2003 | Prased et al. | 429/19 |
| 2003/0235724 A1 * | 12/2003 | Ord et al. | 429/19 |
| 2004/0048115 A1 * | 3/2004 | Devos | 429/19 |
| 2005/0023236 A1 * | 2/2005 | Adams et al. | 215/3 |
| 2005/0158595 A1 * | 7/2005 | Marsh et al. | 429/19 |
| 2007/0036711 A1 * | 2/2007 | Fisher et al. | 423/648.1 |
| 2007/0062115 A1 * | 3/2007 | Berry et al. | 48/61 |
| 2007/0271844 A1 * | 11/2007 | Mohring et al. | 48/61 |

(Continued)

FOREIGN PATENT DOCUMENTS

| | | |
|---|---|---|
| EP | 2259372 A2 | 12/2010 |
| JP | 2007287475 A | 11/2007 |

(Continued)

OTHER PUBLICATIONS

International Search Report for PCT/US2013/029481, Mailed Jun. 26, 2013.

*Primary Examiner* — Imran Akram
(74) *Attorney, Agent, or Firm* — Baker & Hostetler LLP

(57) ABSTRACT

A hydrogen generator system and a fuel cell system including the hydrogen generator system are disclosed. The hydrogen generator system includes a replaceable cartridge that is removably contained within the system, and an external pump disposed outside the cartridge housing and configured to pump a fluid. The cartridge includes a cartridge housing, a liquid reservoir disposed within the cartridge housing and configured to contain a liquid including a reactant, a reaction area disposed within the cartridge housing and within which the reactant reacts to produce hydrogen gas, a liquid flow path disposed within the cartridge housing and through which the reactant liquid can flow from the liquid reservoir to the reaction area, and an internal pump disposed within the cartridge housing that can be operated by the external pump and is configured to transport the reactant liquid through the liquid flow path.

11 Claims, 3 Drawing Sheets

(56) References Cited

U.S. PATENT DOCUMENTS

| | | |
|---|---|---|
| 2009/0101520 A1 | 4/2009 | Zhang et al. |
| 2009/0104481 A1 | 4/2009 | Mohring |
| 2009/0253019 A1 | 10/2009 | Yokozawa et al. |
| 2010/0151361 A1* | 6/2010 | Adams et al. ............... 429/515 |
| 2010/0247426 A1 | 9/2010 | Wallace et al. |
| 2012/0189928 A1* | 7/2012 | Braithwaite et al. ......... 429/416 |

FOREIGN PATENT DOCUMENTS

| | | |
|---|---|---|
| WO | 2007021934 A2 | 2/2007 |
| WO | 2007120757 | 10/2007 |
| WO | 2007136629 A2 | 11/2007 |
| WO | 2012058087 A2 | 5/2012 |
| WO | 2012058687 A2 | 5/2012 |

* cited by examiner

HYDROGEN GENERATOR SYSTEM WITH LIQUID INTERFACE

FIELD OF THE INVENTION

This invention relates to a hydrogen gas generator system, particularly a hydrogen generator system for a fuel cell system that includes a liquid reactant.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the positive electrode side of the fuel cell, and hydrogen is produced from the supplied fuel. In other types of hydrogen fuel cells, hydrogen gas is supplied to the fuel cell from a source outside the fuel cell. A fuel cell system can include a fuel cell battery, including one or more fuel cells, and a hydrogen source, such as a fuel tank, a hydrogen tank or a hydrogen generator. In some fuel cell systems, the hydrogen source can be replaced after the hydrogen is depleted. Replaceable hydrogen sources can be rechargeable or disposable.

A hydrogen generator uses one or more reactants containing hydrogen that can react to produce hydrogen gas. The reaction can be initiated in various ways, such as hydrolysis and thermolysis. For example, two reactants can produce hydrogen and byproducts. An accelerator and/or a catalyst can be used to increase the rate of reaction or catalyze the reaction. When the reactants react, reaction products including hydrogen gas and byproducts are produced.

Various liquids can be used in hydrogen generators. For example, the liquid can include water that can react with another reactant, or the liquid can include water as one reactant and another reactant dissolved in the water, and the water and the other reactant can react under certain conditions (e.g., when the liquid contacts a catalyst, when the liquid is heated and/or when the pH of the liquid is changed) to produce hydrogen gas.

In one type of hydrogen generator at least one reactant is stored in a reservoir as a liquid, and the liquid is transferred from the reservoir to a reaction chamber, where the liquid or a reactant in the liquid reacts to produce the desired gas. Various means have been used to transfer liquids, including pumps. Pumps can also be used to control the rate of hydrogen gas generation by controlling the rate at which the liquid is transferred.

A hydrogen generator can be part of a system that is at least partially replaceable, so depleted reactants can be easily and economically replaced with fresh reactants. Since hydrogen generating systems can include components that do not have to be replaced at the same time as depleted reactants, it can be advantageous for the hydrogen generator system to include both replaceable components and non-replaceable (i.e., reusable) components. This is especially true when relatively expensive components can be reused.

It is desirable to provide a hydrogen generator system capable of supplying hydrogen gas, particularly to a fuel cell system. It is desirable to provide a hydrogen generator system in which depleted reactants can be easily and economically replaced and in which the number of components that can be reused is maximized. It is further desirable that the hydrogen generator system have excellent reliability, safety, and a simple design that is easily manufactured at a low cost. It is desirable that the hydrogen generator system be highly resistant to leaks, particularly leaks of harmful or corrosive liquids, and highly resistant to malfunctioning due to accumulation of solids in lines, valves and so on.

SUMMARY

It has been observed that liquids in hydrogen generator systems can leak, and liquids can dry, particularly in lines, valves and the like through which liquid is transported, especially during times when the hydrogen generating system is not operating. Leakage can result in reduced hydrogen output, damage to components of the hydrogen generator system and materials outside the hydrogen generator system, and even personal injury, especially when potentially corrosive or dangerous materials are included in the liquid. When liquids dry in lines and valves, solids can be left behind that can block or otherwise interfere with their operation. The potential for leakage and drying can be greater when the liquid is transported relatively long distances or through many valves and connections. To minimize these problems it is desirable to design the hydrogen generator system in such a way as to minimize the distance the liquid must be transported and to minimize the number of valves and connections through which the liquid must flow. It is also desirable to minimize the number of other connections, etc., through which the liquid can leak, particularly externally.

The above objects are met and the above disadvantages of the prior art are overcome by a hydrogen generator system and a fuel cell system as described below. Accordingly, one aspect of the present invention is a hydrogen generator system including a replaceable cartridge that is removably contained within the system, and an external pump disposed outside the cartridge housing and configured to pump a fluid. The cartridge includes a cartridge housing, a liquid reservoir disposed within the cartridge housing and configured to contain a liquid including a reactant, a reaction area disposed within the cartridge housing and within which the reactant reacts to produce hydrogen gas, a liquid flow path disposed within the cartridge housing and through which the reactant liquid can flow from the liquid reservoir to the reaction area, and an internal pump disposed within the cartridge housing that can be operated by the external pump and is configured to transport the reactant liquid through the liquid flow path.

The hydrogen generator can include one or more of the following features:

the reactant liquid includes water and a solute in the water;
    the reactant liquid is acidic;
    the reactant liquid is basic;
    the internal pump is a reciprocating pump and the external pump is a reversible pump; the reciprocating pump can be a diaphragm pump with a flexible diaphragm;

the internal pump includes an inlet through which the liquid in the liquid reservoir can enter and an outlet through which pumped liquid can enter a liquid flow path to the reaction area;

the fluid is a gas, preferably a gas comprising air;

the fluid is a liquid; the fluid can have a pH from 3 to 8, preferably from 6 to 8; the fluid can be without a solute therein; the fluid can be water; a portion of the fluid can be mixed with the reactant liquid in the liquid flow path to dilute the reactant liquid.

Another aspect of the invention is a fuel cell system including a fuel cell battery and a hydrogen generator system as described above. At least a portion of the hydrogen generator system can be removable from the rest of the fuel cell system.

These and other features, advantages and objects of the present invention will be further understood and appreciated by those skilled in the art by reference to the following specification, claims and appended drawings.

Unless otherwise specified, the following definitions and methods are used herein:

external means disposed outside a replaceable cartridge housing, and internal means disposed within a replaceable cartridge housing;

"effluent" means non-gaseous reaction products and unreacted reactants, solvents and additives;

"expand" when used in describing a filter means for the filter material to simultaneously increase in volume, increase in porosity and decrease in density and pertains only to the material of which the filter is made;

"initial" means the condition of a hydrogen generator in an unused or fresh (e.g., refilled) state, before initiating a reaction to generate hydrogen;

"volume exchange" means a relationship between two or more areas or containers within a hydrogen generator such that a quantity of volume lost by one or more of the areas or containers is simultaneously gained by one or more of the other areas or containers; the volume thus exchanged is not necessarily the same physical space, so volume lost in one place can be gained in another place.

Unless otherwise specified herein, all disclosed characteristics and ranges are as determined at room temperature (20-25° C.).

DESCRIPTION

Figure 1:
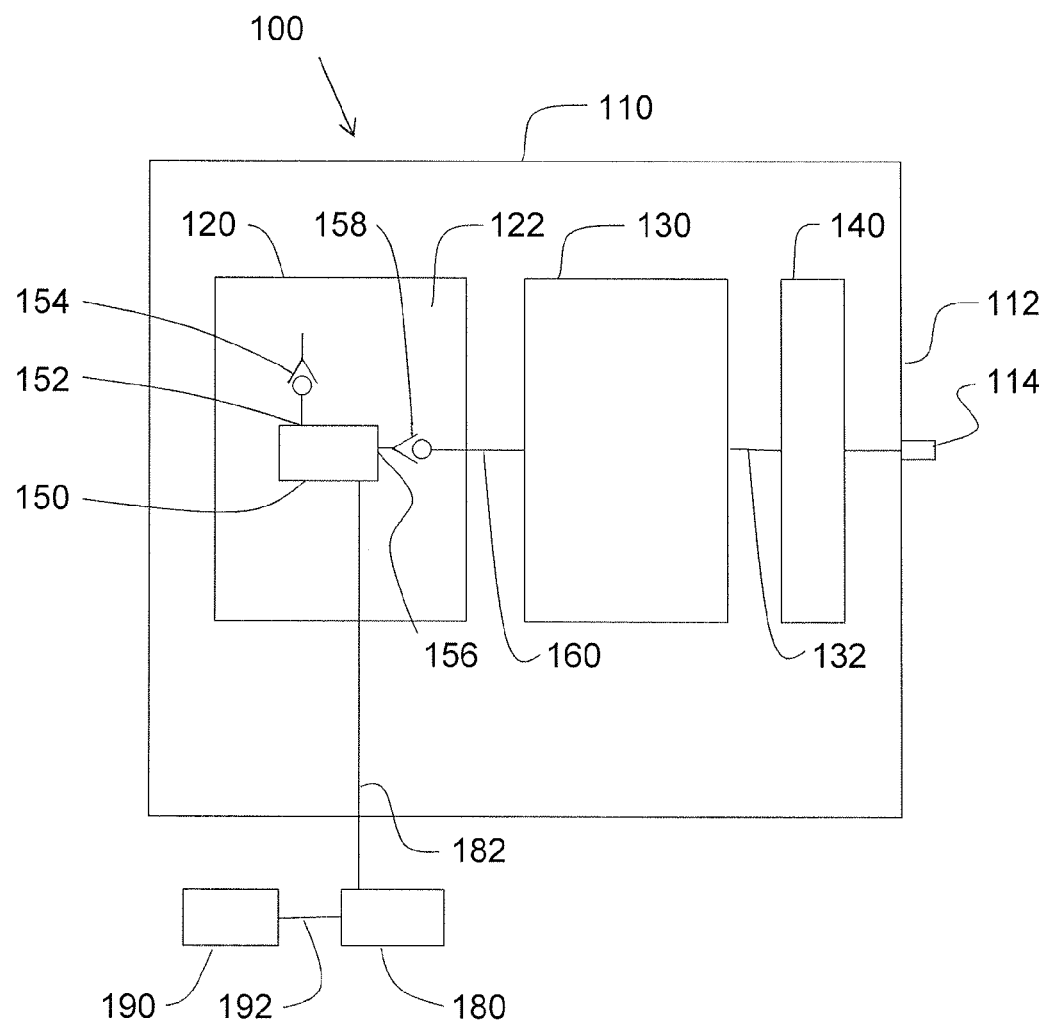
FIG. 1 is a schematic diagram of a first embodiment of the invention.

A hydrogen generator system according to an embodiment of the present invention includes reactants that can react to produce hydrogen gas. One or more reactants are contained in a liquid stored in a reservoir within the housing. The liquid is essentially stable within the reservoir. The liquid is transferred to a reaction area, where the reactants react. If all reactants are contained in the liquid, reaction can be initiated by one or a combination of methods, such as contact with a catalyst, changing the pH of the liquid or heating the liquid. Alternatively, at least one reactant can be located elsewhere in the hydrogen generator. For example, if the other reactant(s) are contained in another liquid, the other liquid can be stored in another reservoir and be transferred to the reaction area to react with the first liquid, or the other liquid can be stored in the reaction area. If the other reactant(s) are in solid form, they can be stored within the reaction area.

In a hydrogen generator system according to the present invention, reactant liquid is transferred between the reservoir and the reaction area by pumping. It is desirable for a portion of the pumping system to be external (located outside the replaceable cartridge containing the reactants, within the system housing). This portion of the pumping system includes an external pump that is preferably durable, so it can be used many times, with many replaceable cartridges. In order to avoid leakage of potentially harmful or corrosive liquids and prevent clogging of lines and valves on or outside the exterior of the replaceable cartridge, only fluid that is not harmful or corrosive and that contains no ingredients that can solidify when the liquid dries is pumped by the external pump. In some embodiments the external pump is capable of pumping fluid in two directions. In some embodiments the external pump does not have to be reversible. Examples of fluids that are suitable include gases such as air and nitrogen, and liquids such as water, alcohol and aqueous solutions (e.g., with alcohol or a weak acid such as malic or citric acid). The pH can be from about 3 to about 8. Preferably the fluid has a neutral or only slightly acidic or basic pH (i.e., from about 6 to about 8). Air is a preferred gaseous fluid. Water is a preferred liquid fluid. In order to transfer reactant-containing liquid, the pumping system also includes an internal pump, located within the replaceable cartridge. Preferably this internal pump is inexpensive, occupies a small volume and has a simple design. The fluid pumped by the external pump can be air from the surrounding environment or a gas or liquid contained in a tank or other suitable container located within or outside the hydrogen generator system. The fluid can be contained in a closed system so it can be reused, or it can be contained in a system that is not completely closed, as described below. Since the reservoir containing reactant liquid, the reaction area and the internal pump are all located within the replaceable cartridge, it is not necessary to pump the reactant liquid outside the cartridge, and the cartridge can be sealed from the external environment to prevent evaporation that could lead to clogging of the liquid flow path and/or internal pump. The internal pump can be located within the liquid reservoir or elsewhere within the cartridge housing. If the internal pump is within the liquid reservoir, the liquid inlet to the internal pump is inside the liquid reservoir and less susceptible to drying of the reactant liquid during long periods of nonuse.

The type of internal pump used is a factor in what type of external pump is used and/or how fluid is pumped by the external pump. For example, if the internal pump uses a reciprocating motion to pump the reactant liquid, the external pump must pump the fluid in both directions, both toward and away from the internal pump. Diaphragm, piston and plunger pumps are examples of an internal pump using a reciprocating motion. For example, fluid pumped toward a diaphragm pump displaces the diaphragm inward, thereby reducing the volume of the pump chamber and forcing the reactant liquid out, while fluid pumped away from the diaphragm pump displaces the diaphragm outward, increasing the volume of the pump chamber and drawing reactant liquid in. Reciprocating pumps can use at least one set of one-way valves to provide flow of the liquid being pumped in only one direction. A fluid operated reciprocating pump can require only a single fluid line between the external and internal pumps, which can minimize the number of locations for possible leakage. Reciprocating pumps can be advantageous as internal pumps because they are simple, relatively inexpensive and are available in a wide range of sizes and materials. An internal pump that uses fluid flow in only one direction requires both a fluid inlet and a fluid outlet. Diaphragm pumps and piston pumps with a double-sided piston (one side driven by the fluid and the other side for pumping the reactant liquid) are examples of this type of pump.

In one embodiment the fluid used to operate the internal pump does not mix with the reactant liquid that is pumped to the reaction area; the fluid is used only to operate the internal pump. The fluid can be completely contained within the external pump, an inlet portion of the internal pump and an optional external fluid tank (outside the cartridge housing). Alternatively, the fluid can be air from the environment outside the cartridge housing and/or outside the hydrogen generator system.

An example of an embodiment in which fluid is used only to operate the internal pump is shown in FIG. 1. FIG. 1 is a schematic diagram of a hydrogen generation system 100 including a replaceable cartridge 110 and an external pump 180. The cartridge has a housing 112, with a liquid reservoir 120 and a reaction area 130 within the housing. Liquid reactant 122 stored within the liquid reservoir 120 is pumped to the reaction area 130, where it reacts to produce hydrogen gas, which flows through a hydrogen flow path 132 to an outlet 114 in the housing 112. The reaction area 130 can be defined by the inside of the housing 112 and the outside of the liquid reservoir 120, or it can be within a separate container. The cartridge 110 can include an optional byproduct containment area 140, in which hydrogen and byproducts from the reaction area 130 are accumulated. Also within the cartridge housing 112 is an internal pump 150, which pumps reactant liquid 122 from the reservoir 120 to the reaction area 130. Reactant liquid 122 is drawn into a pump chamber in the internal pump 150 through an inlet 152. A one-way valve 154 can be used to prevent reactant liquid 122 from flowing back from the internal pump 150 into the reservoir 120. The internal pump 150 pumps reactant liquid 122 out through an outlet 156 and a liquid reactant flow path 160 to the reaction area 130. A one-way valve 158 can prevent reactant liquid 122 from flowing back into the internal pump 150. The internal pump 150 is operated by a fluid pumped by an external pump 180, located outside the cartridge housing 112. The fluid flows to the internal pump 150 through a fluid flow path 182. If the internal pump 150 is a reciprocating pump, the fluid can flow back and forth between the internal pump 150 and the external pump 180 through the fluid flow path 182 as the external pump pumps in the forward (toward the internal pump 150) and reverse (away from the internal pump 150) directions. If the internal pump 150 is not a reciprocating pump, a fluid return path (not shown) can be included for return flow of fluid from the internal pump 150 and the external pump 180. The internal pump 150 can be located within the reservoir 120 as shown in FIG. 1, or it can be located outside the reservoir 120. A supply of fluid can be contained within one or a combination of the pumps 150, 180, the fluid flow path 182 and an optional separate container such as fuel source 190, which supplies fluid to the external pump 180 through supply line 192. Further modifications can be made to the hydrogen generator system 100, as described above and below.

In another embodiment a portion of the fluid used to operate the internal pump mixes with the reactant liquid, thus diluting the reactant liquid. More fluid is pumped toward the internal pump than is needed to force reactant liquid out of the internal pump chamber, e.g., by running the external pump in a forward direction (toward the internal pump) longer than it is run in the reverse direction (away from the internal pump). This excess amount of fluid can flow through a check valve into the liquid flow path between the internal pump and the reaction area, diluting the reactant liquid, either before or after entering the reaction area. Changing the reactant liquid concentration can be advantageous if it is desirable to change the concentration of the reactant liquid during use of the hydrogen generating system (e.g., to increase or decrease the rate of reaction in the reaction area). In a variation, the excess fluid (not required to operate the internal pump) can be supplied directly to a portion of the reaction area or another area of the cartridge. For example, when the fluid is also a reactant, it may be desirable to provide extra fluid to a secondary reaction area to react with particles of unreacted solid reactant that are carried out of the primary reaction area by reaction products, to more fully utilize the solid reactant. In this embodiment the fluid is a liquid that can be stored in a fluid reservoir, preferably within the cartridge so the fluid does not have to be replaced separately from the cartridge.

Figure 2:
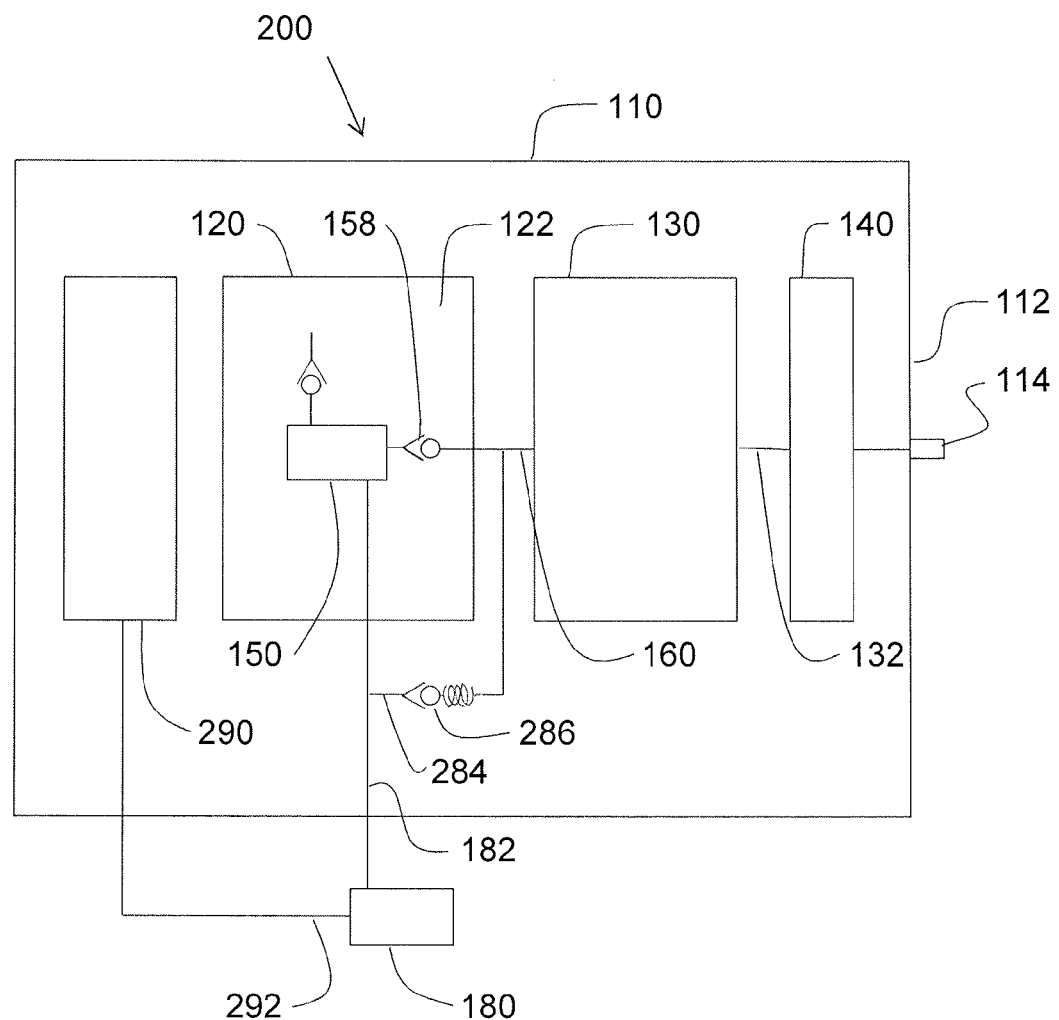
FIG. 2 is a schematic diagram of a second embodiment of the invention.

An example of an embodiment in which fluid is also provided to other parts of the cartridge, for a purpose other than operating the internal pump, is shown in FIG. 2. In this example, fluid is mixed with reactant liquid being pumped from the internal pump to provide a lower concentration of reactant to the reaction area. Except as described below, hydrogen generation system 200 is like hydrogen generation system 100 shown in FIG. 1. The hydrogen generator system 200 differs in several ways. The fluid is stored in a fluid source 290, and the fluid is supplied to the external pump 280 through the fluid supply line 292. Since a portion of the fluid can be consumed during use of the hydrogen generation system 200, it is preferable to include the fluid source 290 within the cartridge housing 112 to facilitate replacement of consumed fluid. As in FIG. 1, fluid is pumped from the external pump 180 to the internal pump 150 through the fluid flow line 182. However, in hydrogen generation system 200, fluid can also be pumped to the liquid reactant flow path 160 to dilute reactant liquid 122 pumped from the internal pump 150. This is done by pumping more fluid than needed to operate the internal pump 150, with the excess fluid flowing through secondary fluid flow path 284. Flow through the secondary fluid flow path 284 is resisted by valve 286, which is a one-way valve but also requires more fluid pressure to open than is needed to operate the internal pump 150. After the liquid reactant in the pump chamber of the internal pump 150 has been pumped through the outlet 156, any additional fluid pumped through fluid flow path 182 is diverted through secondary flow path 284 and valve 286, from which it can flow either into liquid reactant flow path 160 (as shown in FIG. 2) or directly into reaction area 130.

Figure 3:
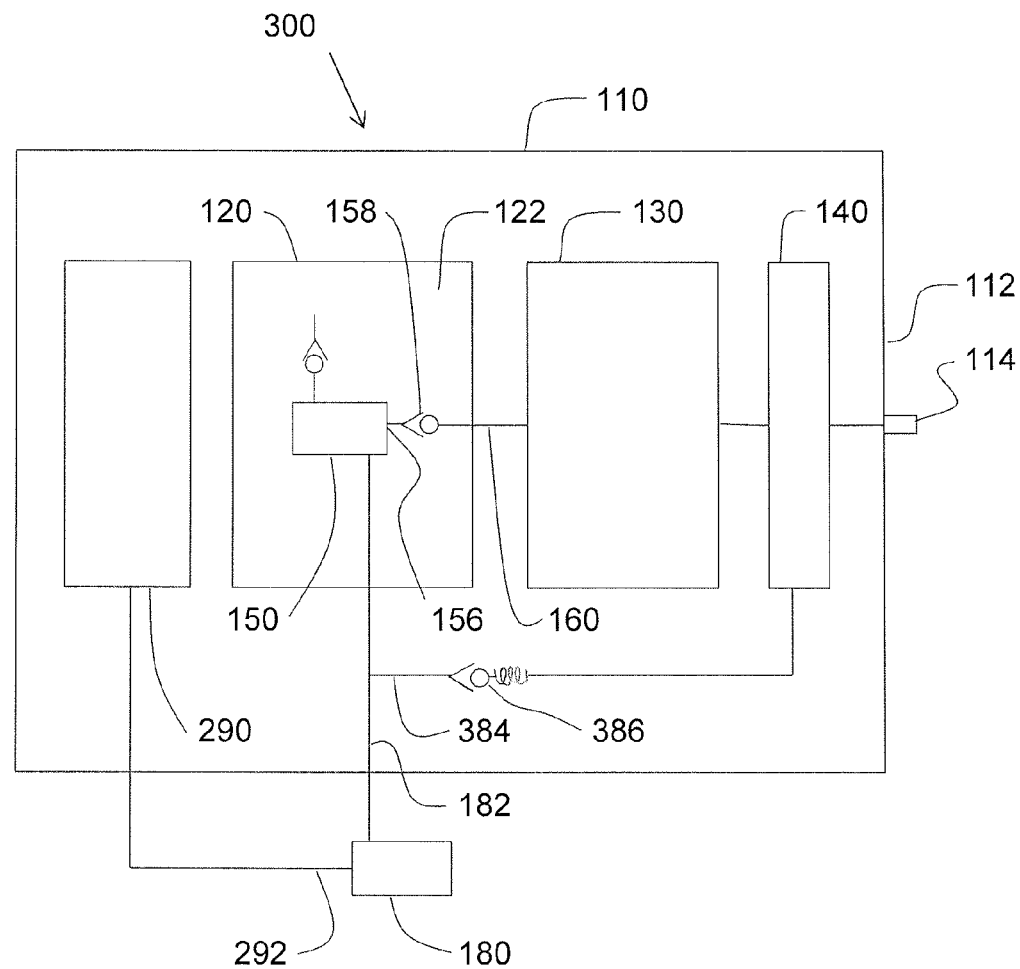
FIG. 3 is a schematic diagram of a third embodiment of the invention.

Another example of an embodiment in which fluid is also provided to other parts of the cartridge, for a purpose other than operating the internal pump, is shown in FIG. 3. As in hydrogen generating system in FIG. 2, the hydrogen generating system in FIG. 3 can also provide fluid (e.g., water) to another portion of the cartridge, to react with unreacted solid reactant (e.g., a chemical hydride) flushed out of the reaction area by reaction products. Hydrogen generator system 300 differs from hydrogen generator system 200 in several ways. Excess fluid pumped into fluid flow path 182 is diverted to secondary fluid flow path 384 and valve 386. Secondary fluid flow path 384 and valve 386 and like secondary flow path 284 and valve 286, except that the secondary fluid flow path 384 takes fluid to the byproduct containment area 140 rather than the reactant liquid flow path 160.

The external pump used as part of the present hydrogen generation system can be any suitable pump. If the internal pump is a reciprocating pump, the external pump must be a reversible pump. In an embodiment an inlet valve on the external pump is opened and the pump draws fluid into the pump chamber of the internal pump, the inlet valve is closed and an outlet valve is opened, and fluid is forced out of the pump chamber toward the internal pump. The external pump operates in this forward direction long enough to pump a sufficient volume of fluid to force the reactant liquid in the pump chamber of the internal pump out. If additional fluid is to be provided (e.g., to dilute the reactant liquid being supplied to the reaction area or to provide fluid to another part of the cartridge), the external pump is operated in the forward direction for a sufficient additional time to provide the desired incremental volume of excess fluid. To complete the cycle of the internal pump, the external pump is reversed to draw sufficient fluid back into the external pump to draw more reactant liquid from the reservoir into the pump chamber of the internal pump. The rate at which reactant liquid is supplied to the reaction area can be adjusted by changing the external pump cycle time, stopping and starting the external pump, or a combination of both. The rate at which fluid is provided to portions of the cartridge other than the internal pump and the relative amounts of reactant liquid and fluid provided can be adjusted by changing the duration of operating the external pump in the forward direction during each cycle of the internal pump.

The invention can be used in many types of hydrogen generator systems. In one embodiment, when the reactants react, hydrogen gas and byproducts are produced in the reaction area and flow to a byproduct containment area. Some unreacted reactants can be carried to the byproduct containment area by the flow of hydrogen gas and byproducts. To minimize the amount of unreacted reactants in the byproduct containment area, a screen or other type of filter can be located near the exit from the reaction area to help retain particles of solid reactants within the reaction area, or additional reactant liquid can be transferred to the byproduct containment area or an intermediate area to react with unreacted reactants carried from the reaction area. Unreacted reactants can also continue to react within the byproduct containment area. A catalyst or accelerant can be included in the byproduct containment area to promote reaction of any unreacted reactants present.

During use of the hydrogen generator system, reactants stored in reservoir and the reaction area are depleted so less volume is required for those areas. If the containers for those areas can become smaller as the contents are depleted (e.g., by collapsing or shrinking), the volume vacated by those areas becomes available to accommodate the increasing volume of the byproduct containment area, which can be in an expandable container. The byproduct container can be made of a gas permeable and liquid impermeable to allow hydrogen gas but not liquids and solids in the byproduct containment area to pass therethrough, so that the gas is separated from the liquids and solids. Gas passing through the byproduct container can be collected within a hydrogen containment area, which can be enclosed in a hydrogen impermeable container, until released through an outlet through the cartridge housing.

Volume exchange between the product containment area and at least one of the liquid reservoir and the reaction area provides good volume efficiency, so that the total volume of the cartridge does not have to be large enough to hold the sum of the volumes of the reactants plus byproducts, and the cartridge can be made as small as possible.

When the hydrogen containment area is sealed within the hydrogen gas container, the hydrogen gas container can provide improved resistance to hydrogen gas leakage from the cartridge, the housing may not have to be made of a hydrogen impermeable material, and the housing does not necessarily have to be hermetically sealed. This allows for the use of many different types of materials for the housing, allows the use of other housing sealing methods, and can simplify the hydrogen generator manufacturing process. Materials can be selected based on other desirable properties such as low cost, high strength, heat resistance, moldability, workability, and so on without regard to hydrogen impermeability. Examples of materials that may be considered include plastics (e.g., polyphenylene sulfides such as RYTON® (Boedeker Plastics), polysulfones such as polyphenylsolfone, polysulfone and polyethersulfone, glass reinforced plastics such as glass fiber reinforced polyacrylamides such as IXEF® (Solvay Advanced Polymers), ceramics (e.g., silicon carbide, kaolinite and glass) and combinations thereof (e.g., metal lined plastic). The container can also be closed using fasteners, such as screws, rivets, nuts and bolts, clips, clamps, and so on, which may not be suitable if a hermetic seal is required, and the use of additional sealants, caulking, gaskets and so on may not be necessary. The container can also be closed using methods that may be capable of providing a hermetic seal, but without the process controls, etc., that may be necessary to insure the seal is hermetic. A separate container for the hydrogen containment area also facilitates reuse of the cartridge, since the contents of a used cartridge can be readily removed and replaced.

Hydrogen gas can be provided by the hydrogen generator system to a hydrogen consuming apparatus such as a hydrogen fuel cell battery. The hydrogen consuming apparatus and the hydrogen generator system can be incorporated into a system (e.g., a fuel cell system) that includes controls for controlling the transfer of reactant liquid from the liquid reservoir to the reaction area of the replaceable cartridge.

The hydrogen generator system can use a variety of reactants that can react to produce hydrogen gas. Examples include chemical hydrides, alkali metal silicides, metal/silica gels, water, alcohols, dilute acids and organic fuels (e.g., N-ethylcarbazole and perhydrofluorene).

An alkali metal silicide is the product of mixing an alkali metal with silicon in an inert atmosphere and heating the resulting mixture to a temperature of below about 475° C., wherein the alkali metal silicide composition does not react with dry $O_2$. Such alkali metal silicides are described in US Patent Publication 2006/0002839. While any alkali metal, including sodium, potassium, cesium and rubidium may be used, it is preferred that the alkali metal used in the alkali metal silicide composition be either sodium or potassium. Metal silicides including a Group 2 metal (beryllium, magnesium, calcium, strontium, barium and radium) may also be suitable. In an embodiment, sodium silicide can react with water to produce hydrogen gas and sodium silicate, which is soluble in water.

A metal/silica gel includes a Group 1 metal/silica gel composition. The composition has one or more Group 1 metals or alloys absorbed into the silica gel pores. The Group 1 metals include sodium, potassium, rubidium, cesium and alloys of two or more Group 1 metals. The Group 1 metal/silica gel composition does not react with dry $O_2$. Such Group 1 metal/silica gel compositions are described in U.S. Pat. No. 7,410,567 B2 and can react rapidly with water to produce hydrogen gas. A Group 2 metal/silica gel composition, including one or more of the Group 2 metals (beryllium, magnesium, calcium, strontium, barium and radium) may also be suitable.

As used herein, the term "chemical hydride" is broadly intended to be any hydride capable of reacting with a liquid to produce hydrogen. Examples of chemical hydrides that are suitable for use in the hydrogen generating apparatus described herein include, but are not limited to, hydrides of elements of Groups 1-4 (International Union of Pure and Applied Chemistry (IUPAC) designation) of the Periodic Table and mixtures thereof, such as alkaline or alkali metal hydrides, or mixtures thereof. Specific examples of chemical hydrides include lithium hydride, lithium aluminum hydride, lithium borohydride, sodium hydride, sodium borohydride, potassium hydride, potassium borohydride, magnesium hydride, calcium hydride, and salts and/or derivatives thereof. In an embodiment, a chemical hydride such as sodium borohydride can react with water to produce hydrogen gas and a byproduct such as a borate. This can be in the presence of a catalyst, heat, a dilute acid or a combination thereof.

Chemical hydrides can react with water to produce hydrogen gas and oxides, hydroxides and/or hydrates as byproducts. The hydrolysis reaction may require a catalyst or some other means of initiation, such as a pH adjustment or heating. Chemical hydrides that are soluble in water can be included in the liquid reactant composition, particularly at alkaline pH to make the liquid sufficiently stable. The reaction can be initiated by contacting the chemical hydride solution with a catalyst, lowering the pH (e.g., with an acid), and/or heating. Chemical hydrides can be stored as a solid, and water can be added. A catalyst or acid can be included in the solid or liquid composition.

One or more catalysts can be used to catalyze the hydrogen producing reactions. Examples of suitable catalysts include transition metals from Groups 8 to 12 of the Periodic Table of the Elements, as well as other transition metals including scandium, titanium, vanadium, chromium and manganese. Metal salts, such as chlorides, oxides, nitrates and acetates can also be suitable catalysts.

The rate of hydrogen generation can be controlled in a variety of ways, such as controlling of the rate at which liquid is transported to the reaction area, adjusting the pH, and making temperature adjustments. The rate of hydrogen generation can be controlled to match the need for hydrogen gas. A control system can be used for this purpose, and the control system can be within or at least partially outside the hydrogen generator.

Additives can be used for various purposes. For example, one or more additives can be included with a solid reactant as a binder to hold the solid material in a desired shape or as a lubricant to facilitate the process of forming the desired shape. Other additives can be included with a liquid or solid reactant composition to control pH. Such additives include but are not limited to acids (e.g., hydrochloric, nitric, sulfuric, citric, carbonic, boric, carboxylic, sulfonic, malic, phosphoric, succinic and acetic acids or combinations thereof), or bases (e.g., hydroxides such as those of Group 1 elements, ammonium, and organic compounds; metal oxides such as those of Group 1 metals; and organic and metal amines). Additives such as alcohols and polyethylene glycol based compounds can be used to prevent freezing of the fluid. Additives such as surfactants, wetting agents and anti-foaming agents (e.g., glycols, polyglycols and polyols) can be used to control the liquid surface tension and reaction product viscosity to facilitate the flow of hydrogen gas and/or effluents. Additives such as porous fibers (e.g., polyvinyl alcohol and rayon fibers) can help maintain the porosity of a solid reactant component and facilitate even distribution of the reactant-containing fluid and/or the flow of hydrogen and effluents.

In one embodiment a chemical hydride such as sodium borohydride (SBH) is one reactant, and an acidic aqueous solution is a reactant liquid. The chemical hydride and water can react when they contact each other in the reaction chamber. The chemical hydride can be stored as a solid in the reaction area, as essentially loose granules or powder or formed into a desired shape, for example. If an increased rate of reaction between the chemical hydride and the reactant liquid is desired, a solid acid such as malic acid can be mixed with the chemical hydride. A chemical hydride can be formed into a mass, such as a block, tablet or pellet, to reduce the amount of unreacted chemical hydride contained in the effluent that exits the reaction area. As used below, "pellet" refers to a mass of any suitable shape or size into which a solid reactant and other optional ingredients are formed. The pellet should be shaped so that it will provide a large contact surface area between the solid and liquid reactants. The density of the pellet can be adjusted, depending in part on the desired volume of hydrogen and the maximum rate at which hydrogen is to be produced. A high density is desired to produce a large amount of hydrogen from a given volume, but high porosity enables a higher rate of hydrogen generation. On the other hand, if the pellet is too porous, unreacted SBH can more easily break away and be flushed from the reaction area as part of the effluent. One or more pellets of this solid reactant composition can be used in the hydrogen generator, depending on the desired volume of hydrogen to be produced by the hydrogen generator. The ratio of water to SBH in the hydrogen generator can be varied, based in part on the desired amount of hydrogen and the desired rate of hydrogen production. If the ratio is too low, the SBH utilization can be too low, and if the ratio is too high, the amount of hydrogen produced can be too low because there is insufficient volume available in the hydrogen generator for the amount of SBH that is needed.

It may be desirable to provide for cooling of the cartridge during use, since the hydrogen generation reactions can produce heat. The cartridge housing may be designed to provide coolant channels. In one embodiment standoff ribs can be provided on one or more external surfaces of the cartridge housing and/or interfacial surfaces with the fuel cell system or device in or on which the hydrogen generator system is installed or mounted for use. In another embodiment the hydrogen generator system can include an external jacket around the cartridge housing, with coolant channels between the cartridge housing and external jacket. Any suitable coolant can be used, such as water or air. The coolant can flow by convection or by other means such as pumping or blowing. Materials can be selected and/or structures, such as fins, can be added to the hydrogen generator system to facilitate heat transfer.

It may be desirable to provide means for heating the cartridge, particularly at startup and/or during operation at low temperatures.

The hydrogen generator system can include other components, such as control system components for controlling the rate of hydrogen generation (e.g., pressure and temperature monitoring components, valves, timers, etc.), safety components such as pressure relief vents, thermal management components, electronic components, and so on. Some components used in the operation of the hydrogen generator system can be located externally rather than being part of the replaceable cartridge, making more space available within the cartridge and reducing the cost by allowing the same components to be reused even though the reactant-containing cartridge is replaced.

The replaceable cartridge can be disposable or refillable. For a refillable cartridge, reactant filling ports can be included in the housing, or fresh reactants can be loaded by opening the housing and replacing containers of reactants. If the cartridge is disposable, it can be advantageous to dispose components with life expectancies greater than that of the cartridge externally, such as in a fuel cell system or an electric appliance, especially when those components are large or expensive.

The liquid reservoir, reaction area, byproduct containment area and hydrogen containment area can be arranged in the cartridge in many different ways. By arranging the byproduct containment area in a volume exchanging relationship with one or both of the liquid reservoir and the reaction area, the cartridge can be more volume efficient and provide a greater amount of hydrogen per unit of volume of the cartridge. Other considerations in arranging the components of the cartridge include thermal management (adequate heat for the desired reaction rate and dissipation of heat generated by the reactions), the desired locations of external connections (e.g., for hydrogen gas, fluid flow to and from an external pump), any necessary electrical connections (e.g., for pressure and temperature monitoring and control of liquid reactant flow rate), and ease of assembly.

Reactant liquid is initially disposed in the liquid reservoir, which is bounded by a container. The container is made of a liquid impermeable material that is stable in the environment of the cartridge (e.g., nonreactive with the contents of the reservoir). It can be either gas impermeable or gas permeable. While the container could be a rigid container, a flexible container can become smaller (e.g., by collapsing and/or contracting) as liquid is transferred out of the reservoir, so that space initially occupied by the reservoir can be made available to an enlarging byproduct containment area. Examples of types of flexible containers include containers with walls having accordion folds, similar to a bellows; elastic containers that can stretch and contract in response to changes in pressure like a balloon; and containers made of nonelastic materials that are not rigid but also do not stretch or contract to a great extent. Examples of flexible, films include polyethylene, polypropylene, polyvinylchloride, rubber, latex, silicone, nylon, Viton, polyurethane, neoprene, buna-N, polytetrafluoroethylene, expanded polytetrafluoroethylene, perfluoroelastomers, and fluorosilicone. Of these, rubber, latex, silicone, Viton, neoprene, buna-N and perfluoroelastomers are generally elastic, as some polyvinylchloride and polyurethane films. All of these films are hydrogen permeable to at least some degree, and most are also generally liquid impermeable.

The reaction area can be an area in which reactants come in contact with each other and/or with one or more reaction initiators such as catalysts, acid or heat, and in which the reactants react to produce hydrogen gas. The reaction area can be within a reaction container, which can be a rigid or flexible container, as described above for the reactant liquid container. With a flexible container the reaction area can participate in volume exchange with the byproduct containment area by becoming smaller as reactants initially stored within the reaction area are consumed. In addition, force applied to the reactants in a reaction area within a flexible container can facilitate good contact among reactants, reaction initiators and additives, as well as help to move hydrogen gas and byproducts out of the reaction area toward the byproduct containment area, to achieve good reactant utilization and hydrogen generation efficiency. In an embodiment, a solid reactant and optional additives are formed into a solid pellet that is initially disposed within the reaction area; a liquid including another reactant is transported to the reaction area, where it contacts the pellet, and a hydrogen generating reaction occurs. The reaction container in this embodiment can include an elastic material that is initially stretched and applies force against the pellet to minimize space between the pellet where unreacted reactant liquid and byproducts can accumulate. An elastic, flexible or non-elastic container can be wrapped with an elastic material (e.g., an elastic film or band) or biased by one or more springs or other biasing members.

A liquid disperser can be used to improve distribution of reactant liquid within the reaction area. For example, the liquid disperser can include features such as one or more nozzles (e.g., spray nozzles), a tubular structure with one or multiple branches and multiple liquid outlets, a wicking member that can wick liquid over a large surface in contact with another reactant in the reaction area, and combinations thereof.

The reaction container includes an outlet from which hydrogen gas and byproducts (gases, fluids and solids) can exit the reaction area. The outlet can be just an opening in the reaction chamber, an additional structure incorporated into the container wall, a screen or filter to retain large solid particles within the reaction area, a valve or a combination thereof.

Unreacted reactants can be carried out of the reaction area by hydrogen gas and byproducts exiting therefrom. These reactants may continue to react after leaving the reaction area, e.g., in the byproduct containment area. This produces additional hydrogen gas and contributes to the total volume of hydrogen that the hydrogen generator produces. In order to maximize the possible hydrogen output, it can be advantageous to transport some of the reactant liquid from the liquid reservoir or a reactant fluid used to operate the internal pump to an area outside the reaction area (e.g., to a portion of the byproduct containment area or an intermediate area between the reaction and byproduct containment areas). This can be especially beneficial when unreacted reactants include solid particles, particularly if there is insufficient unreacted liquid reactant present.

Hydrogen gas and byproducts from the reaction area can enter a byproduct containment area, which can have a byproduct container made of a material that is liquid impermeable but permeable to at least hydrogen gas. Preferably the container is flexible so that it initially encloses a small volume but expands to contain byproducts. The container can be similar to those described above for the reaction area and the liquid reservoir, as long as it is liquid impermeable and hydrogen permeable. Preferably the container has a sufficient hydrogen permeability to allow hydrogen gas to enter the hydrogen containment area at a rate adequate to meet the hydrogen gas demand. Because liquids and solids will not permeate the container, the container separates hydrogen gas from liquids and solids that enter the byproduct containment area. The byproduct container can have a large surface area to both provide a higher rate of hydrogen gas entry into the hydrogen containment area. The large surface area is also useful in preventing blockage of hydrogen transmission through the container due to accumulation of solids on the inner surface of the byproduct container. This is especially advantageous when byproduct and/or unreacted reactants can form a crust that can tend to restrict the transmission of hydrogen gas. Movement of a flexible container can also serve to fracture and/or strip accumulated solids as the byproduct containment area enlarges. It can also be advantageous for the byproduct container to be elastic to further contribute to removing solids from the surface of the container. The initial size of the byproduct containment area can be established based on factors such as the initial volume of reactant liquid in the liquid reservoir, the initial volume of reactants and additives in the reaction area and the volume of byproducts that may be produced (the volume of the byproducts may be greater than the combined volume of the reactants).

To reduce the accumulation of solids on the inner surface of the byproduct container, one or more additional filters can be disposed in the byproduct containment area to remove a portion of the solids as the effluent from the reaction area passes through the byproduct containment area to the surface of the container. A series of filters can be used and arranged so the larger particles will be removed first. For example, the general flow path through the byproduct containment area may be through a coarser, more porous filter first, followed by successively finer, less porous filters, to prevent clogging of the filters. Filters with high stability, low reactivity with the effluent from the reaction area are preferred. Some types of filters can also be initially compressed and expand as the byproduct containment area expands, contributing to the volume efficiency of the hydrogen generator or being less resistant to clogging. Filters can be made of materials such as nylon, polytetrafluoroethylene, polyolefins, carbon and other materials.

Hydrogen gas that passes through the byproduct container can enter a hydrogen containment area, which is sealed within a hydrogen gas container made of a hydrogen impermeable material. The hydrogen gas container serves as a reservoir for hydrogen gas that is generated but not yet released from the hydrogen generator. This provides a buffer that can initially contain a small amount of hydrogen gas that can be provided before sufficient hydrogen has been produced during initial use and following subsequent startups. The hydrogen containment area can also contain hydrogen gas produced during periods when the release of hydrogen gas is halted, between stopping the transfer of reactant liquid to the reaction area and the time at which reactants already in the reaction area (and byproduct containment area) are consumed and generation of hydrogen gas is halted. The size of the hydrogen containment area can be established based on factors such as the types of reactants used, the rate of hydrogen gas production, the volume of byproducts produced, the rate at which hydrogen gas is to be supplied and the amount of hydrogen gas desired to be available at startups.

The hydrogen gas container can be impermeable with respect to hydrogen gas, thereby preventing leakage of hydrogen gas through the hydrogen generator housing, without requiring the walls of the housing to be impermeable with respect to hydrogen gas and the housing to be hermetically sealed. The internal hydrogen gas container can provide a redundant gas seal, adding to the safety and reliability of the hydrogen generator. Hydrogen impermeable materials include metalized polymeric films and metal-polymeric composite films such as laminates with polymeric and metal layers. Examples of suitable polymeric films include polyethyleneterephalate, polyvinylchloride, polyethylene, polycarbonate, polyimide, polypropylene and polyamide. Examples of suitable metals include aluminum, chromium, nickel and gold. An adhesive can be included on surfaces of the material that are sealed to make a sealed container. The entire inner surface can be a layer of material that can function as an adhesive. For example, polyethylene can be heat sealed. A preferred type of material is a laminate including three or more layers, with the middle layer being a metal and the outer layer being polymeric layers.

The hydrogen gas container can enclose both the byproduct containment area and the reaction area so all hydrogen gas produced in the reaction area or downstream therefrom passes through the hydrogen gas container so the hydrogen gas is effectively separated from liquids and solids. The liquid reservoir can be disposed outside or within the hydrogen gas container. It can be advantageous for the liquid reservoir to be within the hydrogen gas container, especially if the reactant liquid contains a hydrogen source that can react during periods of nonuse to produce small amounts of hydrogen gas, since this hydrogen gas can also be captured within the hydrogen gas container, thereby maximizing the hydrogen gas output from the hydrogen generator.

Hydrogen gas exits the hydrogen containment area through an outlet. The hydrogen gas container can be sealed to the outlet. The outlet can include one or more valves to seal the hydrogen generator when it is not providing hydrogen and to allow hydrogen to exit the hydrogen generator when desired.

Some reactants may contain or produce gaseous byproducts, and it may be desirable to remove these gases, especially if they can damage the hydrogen consuming apparatus being supplied with hydrogen. This may require additional filters, etc., either within the hydrogen generator or elsewhere in the system.

The cartridge can include other features, such as a pressure relief mechanism to safely release excessive internal pressure due to an abnormal condition.

The generation of hydrogen gas can be started and stopped by starting and stopping the transfer of reactant liquid from the liquid reservoir to the reaction area. This can be done manually (e.g., with a manually operated switch) or automatically. Automatic operation can be accomplished with a control system, which can be disposed within or outside the hydrogen generator, or a combination thereof. Control can be based on the demand for hydrogen, e.g., for a fuel cell system. In a fuel cell system, demand can be determined by monitoring and/or communicating with the fuel cell stack, an electric appliance being powered by the stack, a battery being charged by the stack, and so on.

The hydrogen generator system can include thermal controls. For example, heat can be applied to assist in initiating the reaction, particularly at startup and when the ambient temperature is low. The cartridge can be cooled if necessary to remove excess heat generated in the hydrogen generating reaction. Heating and cooling can be done by a variety of methods, including air convection, circulation of heating and cooling fluids, electrical heaters, and so on. A thermal control system can also include temperature monitors, etc. The thermal control system may be disposed within or outside the hydrogen generator, or a combination.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:
1. A hydrogen generator system comprising:
 a replaceable cartridge that is removably contained within the system, the cartridge comprising:
  a cartridge housing;
  a liquid reservoir disposed within the cartridge housing and configured to contain a reactant liquid comprising a reactant;
  a reaction area disposed within the cartridge housing and within which the reactant reacts to produce hydrogen gas;

a liquid flow path disposed within the cartridge housing and through which the reactant liquid can flow from the liquid reservoir to the reaction area; and an internal pump disposed within the cartridge housing and configured to transport the reactant liquid through the liquid flow path, the internal pump being operated by a fluid;

an external pump disposed outside the cartridge housing and in flow communication with a source of the fluid, and configured to pump the fluid to operate the internal pump; and a line configured to convey the fluid between the external pump and the internal pump;

wherein the fluid is air supplied by the environment.

2. The hydrogen generator system according to claim 1, wherein the reactant liquid comprises water and a solute in the water.

3. The hydrogen generator system according to claim 1, wherein the reactant liquid is acidic.

4. The hydrogen generator system according to claim 1, wherein the reactant liquid is basic.

5. The hydrogen generator system according to claim 1, wherein the internal pump is a reciprocating pump and the external pump is a reversible pump.

6. The hydrogen generator system according to claim 5, wherein the reciprocating pump is a diaphragm pump comprising a flexible diaphragm.

7. The hydrogen generator system according to claim 1, wherein the internal pump comprises an inlet through which the reactant liquid in the liquid reservoir can enter and an outlet through which pumped reactant liquid can enter a liquid flow path to the reaction area.

8. The hydrogen generator system according to claim 1, wherein a portion of the fluid is mixed with the reactant liquid in the liquid flow path to dilute the reactant liquid.

9. A fuel cell system comprising a fuel cell stack and a hydrogen generator system according to claim 1.

10. The fuel cell system according to claim 9, wherein at least a portion of the hydrogen generator system is removable from the rest of the fuel cell system.

11. The hydrogen generator system according to claim 1, wherein the internal pump is disposed within the liquid reservoir.

* * * * *